United States Patent [19]

Ely

[11] 4,213,695

[45] Jul. 22, 1980

[54] INSTANT FILM COLOR BACK ADAPTOR FOR A CAMERA-PROCESSOR

[75] Inventor: Richard R. Ely, Fairport, N.Y.

[73] Assignee: Itek Corporation, Lexington, Mass.

[21] Appl. No.: 29,228

[22] Filed: Apr. 11, 1979

[51] Int. Cl.³ .................... G03B 13/28; G03B 17/44; G03B 17/04; G03B 17/26

[52] U.S. Cl. .................................. 355/45; 354/161; 354/188; 354/276

[58] Field of Search ............. 355/18, 46, 71, 77, 355/75, 44, 45; 354/124, 161, 83, 187, 188, 157, 194, 276, 210, 283, 284

[56] References Cited

U.S. PATENT DOCUMENTS

| | | | |
|---|---|---|---|
| 929,671 | 8/1909 | Ingersoll | 354/161 |
| 1,298,296 | 3/1919 | Colwell | 354/161 |
| 1,305,097 | 5/1919 | Hansen | 354/188 |
| 1,592,705 | 7/1926 | Piloty | 354/187 X |
| 3,143,051 | 8/1964 | Teeple | 354/210 X |
| 4,001,847 | 1/1977 | McGrath | 354/276 X |

FOREIGN PATENT DOCUMENTS

| | | | |
|---|---|---|---|
| 2657423 | 6/1978 | Fed. Rep. of Germany | 354/210 |
| 26714 | of 1911 | United Kingdom | 354/187 |

*Primary Examiner*—Donald A. Griffin
*Attorney, Agent, or Firm*—Homer O. Blair; Robert L. Nathans; Gerald H. Glanzman

[57] ABSTRACT

It is desirable to position instant film at the viewing imaging plane of a camera-processor having a light shield surrounding the viewing plane. The use of a conventional film holder causes interference between the dark slide and the light shield. By modifying the dark slide, the slide is completely removed from the film holder positioned within the special camera back, and the back is thereafter pivoted to enable the film to be positioned at the viewing plane.

6 Claims, 5 Drawing Figures

INSTANT FILM COLOR BACK ADAPTOR FOR A CAMERA-PROCESSOR

TECHNICAL FIELD

This invention relates to the field of camera-processors.

BACKGROUND ART

Camera-processors are marketed for the production of stats for use in various fields, such as advertising. A particular camera-processor, such as the "Itek" 430 unit, employs an illuminated copyboard having copy positioned thereon, which is imaged by a projection lens system upon a first imaging plane for exposing various types of film. A mirror may be actuated to cause the copy upon the copyboard to be projected and focused upon a second imaging plane having a ground glass viewing screen, so that the image to be focused upon the film may be viewed by the operator before such exposure. The viewing screen is surrounded by a light shield, and thus is recessed within the body of the machine owing to the light shield which improves the contrast of the image viewed by the operator upon the viewing screen in daylight.

It is believed that a considerable market exists for the use of instant film, such as "Polaroid" Land Film, so that excellent color stats may be rapidly produced in addition to the stats developed in the processor, which are of the non-instant variety processed by wet chemicals. The above-mentioned 430 camera-processor manufactured by Itek Corporation is somewhat unusual in that it has a first and second imaging plane, wherein the first imaging plane is used to expose conventional wet-process film to make stats, and the second imaging plane contains a ground glass viewing screen for viewing the copyboard images before making the stats.

A need existed to provide a camera back means which could be positioned at the second imaging plane and be loaded and unloaded in the daylight with instant Land film for recording the images normally just viewed by the operator. This problem was complicated by the fact that the viewing screen is indented into the body of the camera-processor, owing to the need to shield the viewing screen from ambient light to prevent image washout. Should a camera back means be maintained at the second imaging plane, the dark slide within the conventional 8"×10" Land film holder could not be substantially separated from the camera back to expose the film due to the blocking action of the walls of the light shield. One solution to this problem would be to orient the camera back so that the dark slide may be substantially separated from the film holder by pulling it downwardly through an aperture formed within the lower portion of the light shield. The cutting out of such an aperture would make it difficult to modify camera-processors already in the field to permit customers to take advantage of the use of instant film. A second solution to this problem would be to employ a conventionally opened bellows to enable the camera back to be pulled outwardly toward the operator in a direction perpendicular to the plane of the viewing screen. Such a solution would require tracks, ways, or the like, for supporting the camera back, and which would extend outwardly toward the operator. The use of such tracks are asthetically undesirable, and would otherwise complicate the design of the device, might increase the time required to mount the color back adaptor and remove it when it is desired to use the camera-processor in the conventional mode, that is, when a viewing screen is placed at the second imaging plane.

DISCLOSURE OF THE INVENTION

The above-mentioned problems have been solved in accordance with a preferred embodiment of the present invention by providing a camera back means which is pivotably mounted along one side of the second imaging plane and which has a light tight bellows coupled between the area adjacent the second imaging plane and the camera back, which camera back receives a film holder containing instant film and a dark slide. The resulting color back adaptor may be rapidly affixed to camera-processors in the field by quickly removing the viewing screen at the second imaging plane, which is employed in the normal mode of operation, and rapidly pivotably mounting the device to the camera-processor. The camera back means is similar to that of a conventional studio camera, which contains a ground glass plate for viewing the image, and means for receiving a film holder positioned at the imaging plane. The camera back is pivoted outwardly, a film holder is inserted to displace the ground glass viewing screen therein, and the specially modified dark slide is completely removed from the film holder, and the device is swung back into position at the second imaging plane to effect exposure of the instant film.

DETAILED DESCRIPTION

Figure 1:
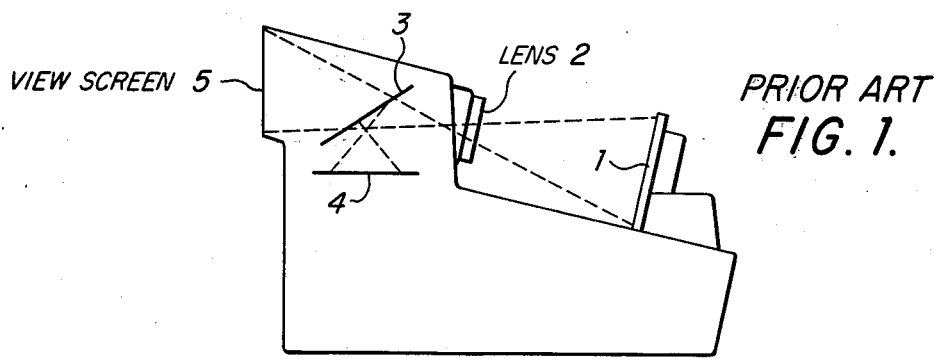
FIG. 1 schematically illustrates certain portions of the above-mentioned prior art camera-processor.

FIG. 1 schematically illustrates portions of the above-mentioned 430 camera-processor manufactured by Itek Corporation, and shows the illuminated copyboard 1, projection lens system 2, mirror 3, and first imaging film plane 4. Mirror means 3 is raised when it is desired to view the image to be photographed and which is focused upon viewing screen 5 positioned at the second imaging plane.

Figure 2:
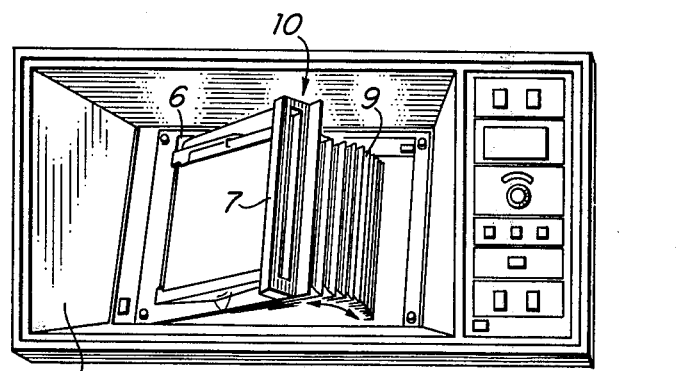
FIGS. 2, 3, and 4 illustrate an embodiment of the present invention.
Figure 3:
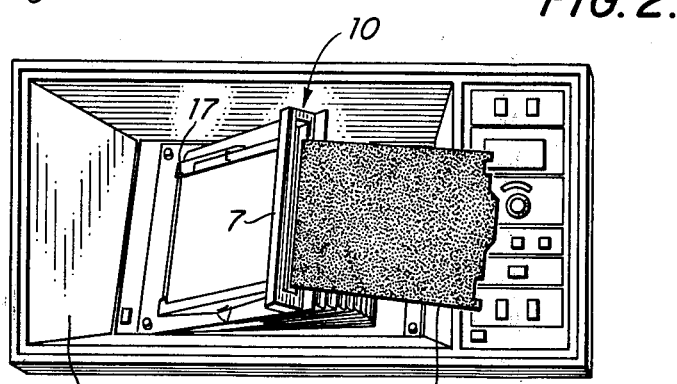

The apparatus of the present invention may be rapidly installed in such camera-processors in the field by rapidly unfastening the viewing screen with its associated mounting frame, and mounting the color back adaptor upon portions of the camera-processor via a second frame member 6 adjacent the second imaging plane. Camera back means 10, of FIG. 2, is pivotably mounted to the mounting plate 6 by quick change fasteners which are no part of the present invention. The operator pushes on handle 7 to position camera back means 10 at the second imaging plane. The camera back means includes a ground glass plate, which enables the operator to view the image focused at the second imaging plane. The operator thereafter pulls on handle 7 to cause the camera back to be pivoted away from the second imaging plane, to enable Land film holder 8 to be inserted into the camera back means (FIG. 3). Such insertion causes the ground glass plate within the camera back to be displaced outwardly so that the film within the film holder will be positioned exactly at the second imaging plane when the camera back is later in position to photograph the objects on the illuminated copyboard. This structure, including the dark slide, is very similar to the well-known studio camera backs, and thus the camera back means has not been illustrated in great detail in the interest of clarity and brevity. However, the dark slide is modified to enable it to be completely removed from the film holder, which is not normally the case with the Land film holder. Such modification is performed by removing the stops, which are normally formed upon terminal portions of the dark slide. FIG. 3 illustrates the commencement of insertion of film holder 8 into the camera back means 10. The dark slide is completely removed, and the operator pushes on handle 7 to cause the film within the film holder to be positioned at the second imaging plane. An a-symmetrically-opened bellows 9 prevents the film from being fogged upon the removal of the dark slide. The film is exposed, and the operator thereafter pulls on handle 7 to cause the camera back means to be pivoted to again assume the positions shown in FIGS. 2 and 3. The dark slide is re-positioned in the film holder to protect the film from subsequently fogging. Film holder 8 may thereafter be removed, and the device is again pivoted to position the ground glass plate within the camera back means at the second imaging plane, to view the next copyboard image, and the process is repeated. The use of quick change fasteners enables the color back adaptor of the present invention to be rapidly removed from the camera-processor and the larger conventional ground glass viewing screen is rapidly mounted in place at the second imaging plane.

Figure 4:
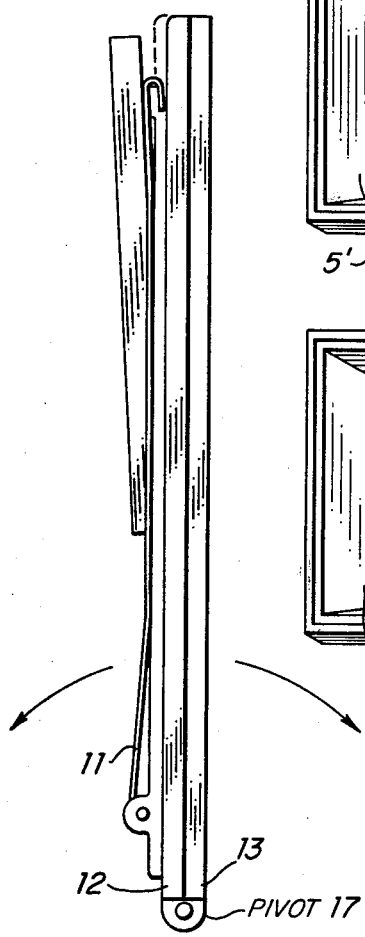

FIG. 4 illustrates the major components of the above-mentioned camera back means. Spring 11 causes ground glass plate 12 to be pressed against frame member 13. Upon the insertion of film holder 8, spring 11 permits separation of ground glass plate 12 from frame 13, and the film holder with dark slide 14 is inserted therebetween. Frame member 13, of course, has a large aperture for permitting the film to be exposed. Pivot means 17 provides for displacement of camera back 10 as explained above.

Figure 5:
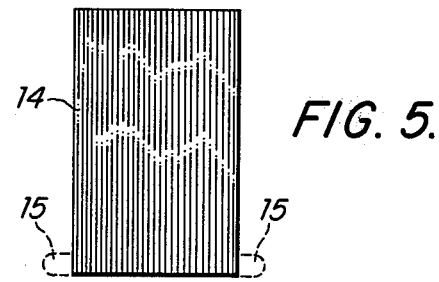
FIG. 5 illustrates the dark slide.

FIG. 5 illustrates dark slide 14, which is merely a thin sheet, with the conventional stops 15, illustrated by dashed lines, removed.

It should be understood that other components and configurations may be substituted for those described in order to practice the invention, and the invention is to be limited only by the permissible scope of the following claims. References are made in the claims to numbered components in the described embodiments, and it should be understood that the claims are not to be restricted to such embodiments, as the numbers employed in the claims are merely exempary of the nature of the claimed means.

I claim:

1. In a camera-processor having a copyboard (1), the image of which is focused upon a first and second imaging plane, the first imaging plane (4) having means for exposing non-instant film, the second imaging plane (5) positioned to facilitate viewing of the image of an object upon said copyboard, and including light shield means (5¹) positioned about said second imaging plane, the improvement comprising:
   a. a camera back means (10);
   b. a film holder (8) for containing instant film;
   c. means (11-13) for receiving and positioning said film holder within said camera back means;
   d. means (17) for pivotably mounting said camera back along one side of said second imaging plane; and
   e. a light tight bellows (9) having one terminal portion thereof coupled to said camera-processor about said second imaging plane and having a second terminal portion coupled to said camera back means so that said camera back means may be pivotably displaced from said second imaging plane for loading and unloading film therein in daylight.

2. The combination as set forth in claim 1, wherein said film holder further includes a dark slide (14) configured to be completely removed from said film holder, thereby to permit said camera back to be pivoted to position said camera back at said second imaging plane.

3. The combination as set forth in claims 1 or 2, wherein said camera back means further includes a viewing screen (12).

4. In a camera-processor having means (1) for projecting a focused image upon a first and second imaging plane, the first imaging plane (4) having means for exposing non-instant film, the second imaging plane (5) positioned to facilitate viewing of the image of an object upon said copyboard, and including light shield means (5¹) positioned about said second imaging plane, the improvement comprising:
   a. a camera back means (10);
   b. a film holder (8) for containing instant film;
   c. means (11-13) for receiving and positioning said film holder within said camera back means;
   d. means (17) for pivotably mounting said camera back along one side of said second imaging plane; and
   e. light sealing means (9) having one terminal portion thereof coupled to said camera-processor about said second imaging plane and having a second terminal portion coupled to said camera back means so that said camera back means may be pivotably displaced from said second imaging plane for loading and unloading film therein in daylight.

5. The combination as set forth in claim 4, wherein said film holder further includes a dark slide (14) configured to be completely removed from said film holder, thereby to permit said camera back to be pivoted to position said camera back at said second imaging plane.

6. The combination as set forth in claims 4 or 5, wherein said camera back means further includes a viewing screen (12).

* * * * *